United States Patent [19]

Stambaugh et al.

[11] Patent Number: 5,133,947
[45] Date of Patent: Jul. 28, 1992

[54] HYDROUS TRIVALENT CHROMIUM OXIDE/CARBON PARTICLES AND METHOD OF MAKING THE SAME

[75] Inventors: Edgel P. Stambaugh, Worthington, Ohio; Russell J. Morgan, Grand Island, N.Y.

[73] Assignee: Occidental Chemical Corporation, Niagara Falls, N.Y.

[21] Appl. No.: 487,313

[22] Filed: Mar. 2, 1990

[51] Int. Cl.$^5$ .............................. C01G 37/02
[52] U.S. Cl. ...................................... 423/55
[58] Field of Search ........................ 423/55

[56] References Cited

U.S. PATENT DOCUMENTS

| | | | |
|---|---|---|---|
| 2,833,645 | 5/1958 | Erasmus | 75/84 |
| 2,850,378 | 9/1958 | Cooper | 75/84 |
| 3,065,095 | 11/1952 | Foos et al. | 106/300 |
| 3,090,670 | 5/1963 | Stambaugh et al. | 23/140 |
| 4,033,867 | 7/1977 | Jacques | 423/55 |
| 4,367,213 | 1/1983 | Fiorucci | 423/55 |

*Primary Examiner*—Peter D. Rosenberg
*Attorney, Agent, or Firm*—James F. Tao; Richard D. Fuerle

[57] ABSTRACT

Disclosed is a method of making particle which comprise hydrous trivalent chromium oxide having the empirical formula $CrO_2H$ intimately associated with a pulverulent carbonaceous substrate. A composition is formed which comprises an aqueous solution of water-soluble hexavalent chromium compound and a reducing agent in an amount sufficient to reduce the hexavalent chromium compound to the hydrous trivalent chromium oxide and to reduce the hydrous trivalent chromium oxide to metallic chromium. The reducing agent comprises a water-insoluble pulverulent carbonaceous substrate. Chrome metal can be made by heating the particles at a temperature of about 1100° to about 1400° C.

32 Claims, 1 Drawing Sheet

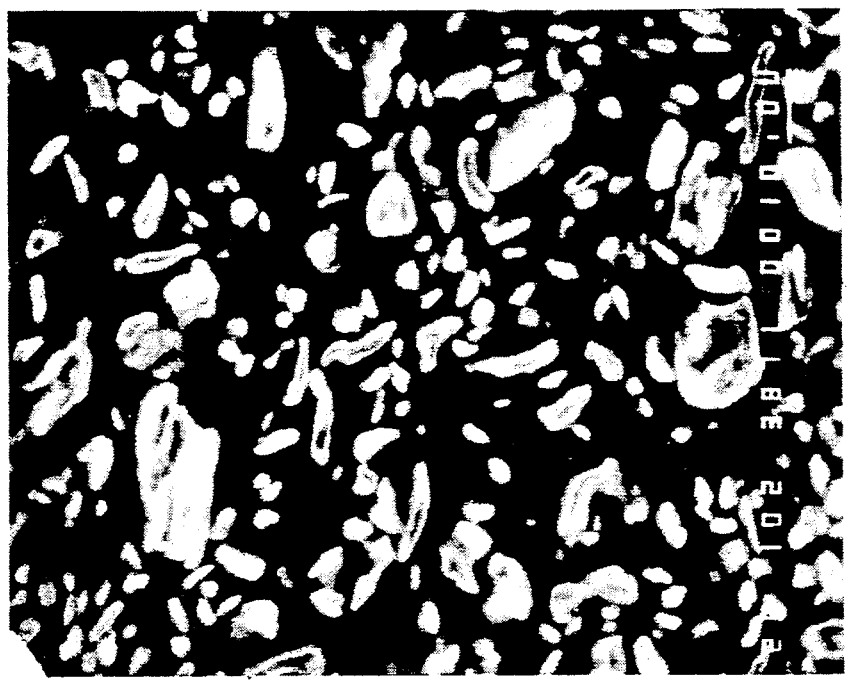
FIGURE 1. CROSS-SECTION OF CROOH/C PARTICLES
(1 cm = 10 microns) (Run K)
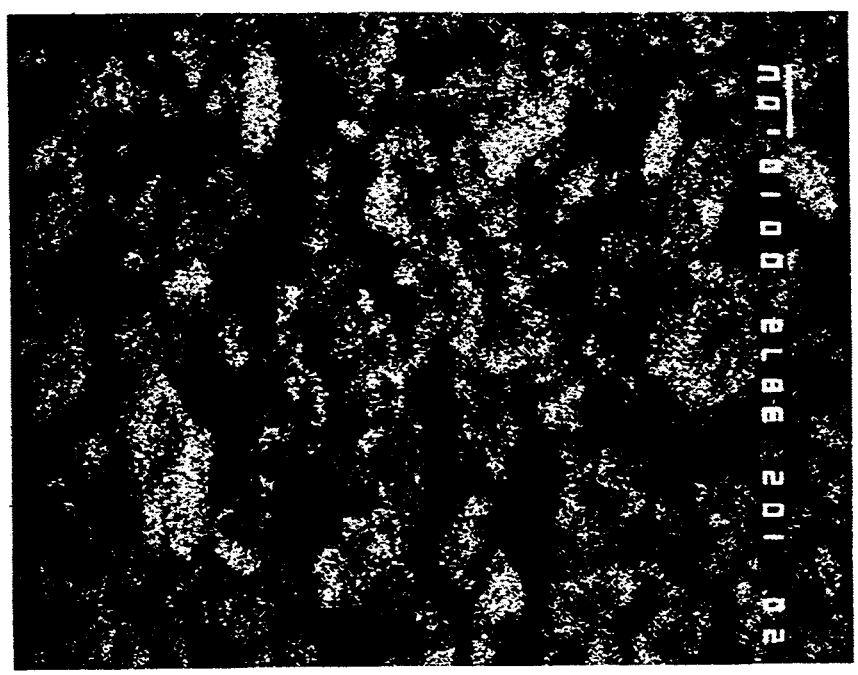
FIGURE 2. DISTRIBUTION OF CHROMIUM CROOH/C PARTICLES
(1 cm = 10 microns) (Run K)

5,133,947

HYDROUS TRIVALENT CHROMIUM OXIDE/CARBON PARTICLES AND METHOD OF MAKING THE SAME

BACKGROUND OF THE INVENTION

This invention relates to a method of making particles of hydrous trivalent chromium oxide intimately associated with a carbonaceous substrate, to the particles themselves, and to a method of using the particles to produce metallic chromium.

Chromium is one of a number of metals that are used to form alloys for use in the aerospace and other industries. For example, nickel, cobalt, chromium, and molybdenum are used to form "superalloy" which is used in the aerospace industry. Very high purity metals are required to form these alloys because the slightest amount of impurity can seriously detract from the properties of the resulting alloy. For many of these alloys, chromium is the dirtiest metal that is used in forming them.

High purity chromium can be produced electrolytically, but that process is very capital intensive and is quite expensive. In another method of making metallic chromium, finely divided chromic oxide, $Cr_2O_3$, is physically mixed with finely divided carbon and a binder. The mixture is briquetted to aid the diffusion controlled reaction and the resulting briquettes are roasted under a reduced pressure, so that the carbon reduces the chromic oxide to metallic chromium. Because it is difficult to insure a homogenous mixture of carbon and $Cr_2O_3$ in the briquettes, the production of a suitably pure metal typically involves reprocessing the partially reacted briquettes by grinding, adjusting the stoichiometry of the reactants (if necessary), re-briquetting, and re-roasting. While this process can produce the high purity chromium required for many alloys, it is also a very expensive process.

SUMMARY OF THE INVENTION

We have discovered a method of making particles of hydrous trivalent chromium oxide that are intimately associated with a pulverulent carbonaceous substrate. Unlike the briquettes used in the prior art process of making metallic chromium, which are a physical mixture of particles of chromic oxide and particles of carbon, the particles of this invention consist of carbonaceous substrate on which hydrous chromium oxide has been molecularly precipitated. In the process of this invention, the particles of carbonaceous substrate reduce water-soluble hexavalent chromium to water-insoluble trivalent chromium, resulting in the precipitation of the hydrous trivalent chromium oxide. Because the carbonaceous substrate causes the reduction of the hexavalent chromium, the precipitate forms on the carbonaceous substrate and penetrates the particles of carbonaceous substrate, resulting in intimate contact between them.

When the particles are subsequently heated, the carbonaceous substrate further reduces the hydrous trivalent chromium oxide to metallic chromium. Because of the intimate contact between the carbonaceous substrate and the hydrous trivalent chromium oxide, the reduction to chrome metal occurs faster, at a lower temperature, and at a higher yield than does the reduction of chromic oxide in the prior art briquettes. The reduction to chrome metal is so effective in the process of this invention that, unlike the prior process that used briquettes of chromic oxide, it is not necessary to briquette the hydrous chromium oxide at all, and it is not necessary to stop the roasting before completion.

For these reasons, the process of this invention can produce chrome metal of a given purity less expensively than can prior processes. Also, because the chromium precipitates from a solution, many of the impurities that were associated with the chromium do not precipitate with the chromium. As a result, the process of this invention is capable of producing a very high purity chrome metal.

BRIEF DESCRIPTION OF THE DRAWING

FIGS. 1 and 2 are photomicrographs of particles according to this invention formed as described in Example 1 which follows.

DESCRIPTION OF THE INVENTION

The composition from which the particles of this invention are produced is a slurry which comprises an aqueous solution of water-soluble hexavalent chromium compound, pulverulent carbonaceous substrate, and optional reducing agent.

Any water-soluble hexavalent chromium compound, or mixtures thereof, can be used as the source of chromium. High purity compounds are preferred as they result in a purer chromium metal. Examples of such chromium compounds include alkali metal chromates and dichromates, and chromic anhydride (which forms chromic acid in water). Such hexavalent chromium compounds are available from the chemical processing of chromite ore. Particularly preferred are sodium chromate, sodium dichromate (also known as sodium bichromate), and chromic acid, as these compounds are less expensive; most preferred is sodium dichromate as it is the least expensive source of chromium. The solution may have any concentration of hexavalent chromium compound. About 10 to about 85% by weight chromium (based on solution weight) is preferred as lower concentrations require a larger reactor size and higher concentrations make it more difficult to remove soluble compounds, such as sodium carbonate, that are precipitated on or in the carbon particles during reaction or left on the particles when they are dried, and these impurities can end up in the chrome metal product. However, we have found that when the chromium compound is sodium chromate or sodium dichromate, hydrous chromium oxide having a lower concentration of sodium can be obtained by using a chromium compound concentration of less than 20%, with less than 10% being preferred.

Any carbonaceous substrate, or mixtures thereof, may be used, provided it is pulverulent and water-insoluble, as all carbonaceous substrates will reduce hexavalent chromium to trivalent chromium and then to chrome metal. The carbonaceous substrate must be finely divided, although it can be agglomerated. A high surface area is preferred, so an ultrafine (less than 200 mesh) particle size or a porous agglomerated particle is preferred as this results in a more intimate contact and higher penetration between the precipitated hydrous trivalent chromium oxide and the carbonaceous substrate. Examples of suitable carbonaceous substrates include coal, carbon, wood flour, graphite, coke, grain flour, lampblack, carbon black (pearls), and petroleum coke. The preferred carbonaceous substrates are graphite, carbon black, and petroleum coke as they are purer.

The amount of carbonaceous substrate that is present must be in excess of the amount required to reduce the hexavalent chromium compound to the hydrous trivalent chromium oxide so that carbonaceous substrate remains for the hydrous trivalent chromium oxide to precipitate upon during the reduction reaction. The amount of carbonaceous substrate stoichiometrically required to reduce hexavalent chromium to trivalent chromium is 1.5 moles of carbonaceous substrate (based on carbon content) for every 2 moles of chromium. Preferably, the amount of carbonaceous substrate is sufficient to reduce not only the hexavalent chromium compound to the hydrous trivalent chromium oxide, but also to reduce the hydrous trivalent chromium oxide to chrome metal. An additional 3 moles of carbon for every 2 moles of chromium are stoichiometrically required to reduce the hydrous trivalent chromium oxide to chrome metal and, therefore, it is preferable to use a total of about $4\frac{1}{2}$ moles of carbonaceous substrate for every 2 moles of chromium so that enough carbonaceous substrate is present to reduce hexavalent chromium all the way to chrome metal.

While it is not preferred in all cases, there may be circumstances in which it is desirable to supplant some of the carbonaceous substrate with an optional reducing agent. For example, the use of an optional reducing agent may permit operating at lower temperatures or may speed up the reaction. If a plant is producing water gas (a mixture of carbon monoxide and hydrogen) it may be more economical to use the water gas as a substitute for some of the carbonaceous substrate. However, enough of the carbonaceous substrate must always be present to reduce at least some (e.g., at least 10%) of the hexavalent chromium compound to the hydrous chromium oxide in order to produce the intimate mixture of the hydrous chromium oxide on the carbon particles. Preferably, the optional reducing agent reduces hexavalent chromium at a lower temperature than does the carbonaceous substrate so that the optional reducing agent reacts before the carbonaceous substrate and the carbonaceous substrate is not consumed. The optional reducing agent may be a liquid, a soluble solid, or a gas. Examples of optional reducing agents include carbon monoxide, hydrogen, methane, ethane, propane, sugar, corn syrup, and ethanol. Mixtures of optional reducing agents may also be used. Carbon monoxide or mixtures of carbon monoxide and hydrogen are the preferred optional reducing agents. It has been shown that carbon monoxide reacts at a lower temperature than carbon.

If low sulfur chromium is to be produced, a desulfurizing agent, such as a tin salt or tin metal, can be added to the composition or to the hydrous chromium oxide particles. Alternatively, by using a hexavalent chromium compound containing less than 0.25% by weight sulfate and a reducing agent containing less than 0.01% by weight sulfur, and probably less than 1.7% sulfur, chromium metal containing less than 0.007% by weight sulfur can be produced without using a desulfurizing agent.

The composition, consisting of the aqueous solution of the hexavalent chromium compound, the insoluble carbonaceous substrate, and the optional reducing agent, is reacted hydrothermally, continuously or in batch, by heating above 100° C. (Alternatively, a partial reduction of the hexavalent chromium compound can first be accomplished using an optional reducing agent at a temperature under 100° C., but this is not preferred.) While the minimum temperature that can be used is about 100° C., it is preferable to heat at a temperature of at least 200° C. because lower temperatures may result in the production of $Cr_2O_3 \cdot 2H_2O$ which is undesirable because it contains more water than $CrO_2H$ and more energy must be used to remove that water. Reaction temperatures over 300° C. are less desirable because the high pressure generated at those temperatures increase the design and cost of the reactor. The maximum temperature is the critical temperature of water (374° C.). It is preferable to prevent the loss of water from the reactor. At temperatures over 100° C., of course, this means that the reaction must be under pressure, and preferably the minimum pressure is the equilibrium vapor pressure of water at the reaction temperature. While we do not wish to be bound by any theories, we believe that under these conditions the following reaction occurs when sodium dichromate is used:

$$2Na_2Cr_2O_7 \cdot 2H_2O + 3C \rightarrow$$
$$CrO_2H + 2Na_2CO_3 + CO_2 + 2H_2O$$

The reaction can be followed by pulling samples from time to time and the reaction is complete when essentially all the hexavalent chromium compound has been consumed, which typically requires about 5 to about 30 minutes. The composition can then be cooled and the particles filtered off and washed with water or dilute acid several times to remove sodium or other ions that may be present. It is preferable to dry the particles at this point.

The particles that are formed will be of approximately the same dimensions as the particles of carbonaceous substrate that were used to form the composition. Typically, the particles have a size of about 5 to about 20 microns. The hydrous trivalent chromium oxide has the empirical formula $CrO_2H$. It is believed to consist almost entirely of the compound CrOOH (i.e., HO—Cr=O) although it is believed that dimers, trimers, etc. (i.e., $(HO)_2$—Cr—O—Cr=O, $(HO)_2$—Cr—O—CrOH—O—Cr=O, etc.) may also exist and form part of the hydrous chromium oxide. The hydrous chromium oxide is believed to precipitate when in contact with the carbonaceous substrate and, therefore, it is molecularly dispersed on and throughout the carbonaceous substrate. It also bonds to or adheres to the carbonaceous substrate, unlike a physical mixture of carbonaceous substrate particles and particles of chromic oxide.

It is preferable to use the particles directly to produce chrome metal but there may be circumstances in which it is desirable to convert the hydrous chromium oxide in the particles to chromic oxide. For example, composite particles of chromic oxide/carbonaceous substrate may be useful in some processes such as forming alloys. They can also be used, of course, to form metallic chromium in the same way that the particles of hydrous chromium oxide/carbonaceous substrate are used. Particles of chromic oxide/carbonaceous substrate can be formed by heating particles of hydrous chromium oxide/carbonaceous substrate at a temperature of about 300° to about 500° C., preferably in an inert atmosphere to avoid consumption of the carbonaceous substrate. The following reaction is then believed to occur: $2CrO_2H \rightarrow Cr_2O_3 + H_2O$.

Chromium metal can be formed from particles of hydrous chromium oxide/carbonaceous substrate or particles of chromic oxide/carbonaceous substrate by heating the particles at a temperature of about 1100° to about 1400° C., preferably under vacuum in order to remove gases formed in the reaction and drive the reaction to completion. The reaction can proceed without an intermediate grinding or briquetting step, because it is not believed to be necessary to stop the reaction before completion in order to adjust the stoichiometry or homogenize the mixture. In the case where large masses of material are heated at one time, it is desirable to allow the water of hydration to come off prior to heating to the reaction temperature. Both types of particles may also have other uses, such as in forming pigments or paints.

The following examples further illustrate this invention.

EXAMPLE 1

This example shows the general process, including feed preparation, reaction, and separation used in the vast majority of the experimental work. In addition, Table 1 shows the effect of time/temperature on the conversion of the bichromate to CrOOH. A commercial grade 69% solution $Na_2Cr_2O_7 \cdot 2H_2O$ was diluted with de-ionized (DI) water to a volume of 1.5 liters in a removable Hastalloy C-276 liner of a one gallon autoclave and finely divided carbon was added to the solution. The carbon/bichromate mixture was mixed for about 20 minutes in order to wet and disperse the carbon throughout the bichromate solution. After mixing, the liner and contents were transferred and sealed into a 1 gallon, magnetically-stirred, electrically-heated, batch-type, 316 stainless steel autoclave with a pressure rating of 5500 psi. The reaction mixture was heated at a rapid rate to the desired reaction temperature (200° to 300° C.). Time, temperature, and pressure were monitored during the entire run. The reaction mixture was maintained at the reaction temperature from 15 to 30 minutes. After reaction, the heating mantle was lowered away from the autoclave and the reaction mixture was allowed to cool to 80° C. The liner and contents were removed from the autoclave. The reaction mixture was diluted up to its original volume with DI water to replace the small amount of water which condensed between the wall of the autoclave and the wall of the liner. The slurry was reheated to 80° C. and filtered. The wet cake was washed thoroughly with DI water in a series of re-slurry/filtration washing operations. A small sample of the cake was dispersed in alcohol for particle size determination. The washed cake was then dried in an oven at 130° C. The product was a finely divided black powder.

Table 1 shows the results obtained from a number of experimental runs under a variety of experimental conditions. Temperatures at 200° C. produced bichromate conversions of about 85% (Runs D and E). At 250° C., the conversion was 98.1%. At 300° C., the conversion was essentially 100% complete (Runs B,C,F, and G). The results of these runs indicate that reaction below 200° C. is less desirable in that the raw material efficiency of the product becomes a significant part of the manufacturing cost.

TABLE 1

| Run No. | $Na_2Cr_2O_7 \cdot 2H_2O$ (grams) | Carbon (grams) | Temp. (°C.) | Pressure (psig) | Time (min.) | Conversion (%) |
| --- | --- | --- | --- | --- | --- | --- |
| A | 150 | 18.2 | 300 | 1285 | 30 | 89.30 |
| B | 150 | 42.3 | 300 | 1262 | 30 | 100.00 |
| C | 130 | 42.3 | 300 | 1274 | 15 | 100.00 |
| D | 130 | 42.3 | 200 | 271 | 15 | 84.90 |
| E | 130 | 42.3 | 200 | 313 | 30 | 86.40 |
| F | 388 | 126.9 | 300 | 1225 | 30 | 99.95 |
| G | 388 | 126.9 | 300 | 1262 | 15 | 99.95 |
| H | 388 | 126.9 | 250 | 654 | 30 | 98.10 |
| I | 900 | 59.0 | 300 | 1531 | 30 | 82.60 |
| K* | 1268 | 228.4 | 300 | 1670 | 30 | 95.10 |

*Carbon source was graphite, all other experiments used amorphous carbon.

In run K, a sample of the material was mounted in a resin, ground (cross-sectioned), so as to intersect the CrOOH/C particle and examined under a scanning electron microscope (SEM), and by wavelength dispersive analysis. FIGS. 1 and 2 are photomicrographs taken during the SEM analyses. FIG. 1 shows the intersected particles at 1000x magnification. FIG. 2 is the X-ray dispersive mapping of the chromium in FIG. 1 and shows that the chromium is dispersed not only on the surface of the carbon particle but has precipitated into the particle as well.

EXAMPLE 2

This example shows the effect of washing technique on residual sodium in the CrOOH/C particle.

A quantity of the CrOOH/C material was generated under conditions similar to that used to produce material in Run K of Example 1 except that the reaction time was increased from 30 minutes to 60 minutes to increase the degree of chromium recovery. Thus, 1268 grams of $Na_2Cr_2O_7 \cdot 2H_2O$ and 228.4 grams of carbon were reacted together at 300° C. for 60 minutes. The product was removed from the autoclave and diluted back to its original volume, heated, and filtered at 80° C. The press cake from the primary filtration was given two hot water washes at a water:CrOOH/C ratio of 1.1:1. To the wet cake was added 80° C. DI water and the slurry was stirred for a period of 30 minutes while maintaining the slurry temperature at 80° C. The slurry was then filtered and the process repeated again. A sample of this wet cake contained 3.4% sodium (dry basis). Another portion of this wet cake was re-slurried with DI water (4.6:1 water to CrOOH/C ratio), washed for 30 minutes and filtered This washing process was repeated four more times on the same solids. The sodium analyses of this material was 0.8%. Another portion of hot water washed wet cake was re-slurried with DI water (4.6:1 water to CrOOH/C ratio) and acidified with 10% HCl to a pH of 2 over a period of 15 to 30 minutes. The acidified slurry was allowed to stir for 30 minutes and then was filtered. The wet cake from the acid wash was then re-slurried and washed with ambient temperature DI water four additional times as above. The sodium content of this material was 1035 ppm.

EXAMPLE 3

In the production of a 5 kilogram quantity of the CrOOH/C material several batches of material were mixed, reacted, filtered, hot water washed, and ambient temperature washed as in Example 2. The composite mixture had a sodium content of 450 ppm.

EXAMPLE 4

This example shows the effect of bichromate concentration on residual sodium in the CrOOH/C product. A 7.5% $Na_2Cr_2O_7 \cdot 2H_2O$ solution was mixed with carbon to produce a 4.5:1 carbon to bichromate molar ratio. Conditions of mixing and reaction were similar to Run K in Example 1. The mixture was reacted in the autoclave at a temperature of 300° C. for 30 minutes. The product slurry was diluted back to its original volume, heated to 80° C., and filtered. The wet cake (after the primary filtration) was re-slurried with hot water and was filtered and the re-slurry/wash procedure repeated. Conditions of the hot water wash were as described in Example 2. The wet cake was then re-slurried with ambient temperature DI water, mixed, and filtered. This procedure was repeated five times as described in Example 2. Mix times between filtration steps were all 30 minutes in duration. Results of the sodium analyses showed that the concentration of sodium in the solids was reduced to 350 ppm. X-ray diffraction analysis of the hydrous chromium oxide/carbon particles showed that the crystalline chromium compound produced was CrOOH.

EXAMPLE 5

This example teaches the use of alternate reducing agents used in conjunction with the carbon to generate the CrOOH/C composite particle. To a removable Hastalloy C-276 liner was charged 200 grams of $Na_2Cr_2O_7 \cdot 2H_2O$ as a 69% commercial grade solution. The solution was diluted to 1.5 liters with DI water and the liner and contents were sealed in the autoclave. An over-pressure of carbon monoxide of 400 psi was charged to the autoclave. The autoclave was heated to 250° C. A drop in the reactor pressure at 225° C. indicated that the reaction with carbon monoxide proceeds at a lower temperature than with the carbon. The reaction mixture was held at 250° C. for 30 minutes and then cooled to about 80° C. The volume of the product slurry was then adjusted back to 1.5 liters with DI water as in the other examples and heated back up to 80° C. The product slurry was then filtered and re-slurried with ambient temperature DI water at a 4.4:1 water to CrOOH weight ratio. The pH of the slurry was adjusted to a pH of 7 with acetic acid and the product slurry was mixed for 30 minutes and the slurry filtered. The re-slurry washing technique was repeated three more times. The dark blue-green solids contained about 1% sodium on a dry solids basis which further demonstrated the need for a lower pH acid wash. However, the fact that the carbon monoxide reaction seems to occur at a lower temperature than the carbon reaction suggests that carbon monoxide can be utilized in conjunction with the carbon to control the percentage of the reduction reaction associated with either reducing agent. This can be accomplished by controlling the total amount of CO introduced at the lower reaction temperature and completing the reaction at the higher temperature with the excess carbon.

EXAMPLE 6

This example teaches the use of the CrOOH/C composite particle as a preferred starting material for the manufacture of chrome metal. Briquettes of the CrOOH/C composite material are made by mixing the material with an appropriate binder (e.g., corn sugar, molasses, starch or polyvinyl alcohol) and pressing. Then 50 grams of the CrOOH/C composite material (at a 1.5:1° C. to Cr molar ratio) in loose form and 50 g of the briquette are placed in a molybdenum crucible or tray. A physical mixture of $Cr_2O_3$ and finely divided carbon as loose powder and as briquettes (formed under the same pressure and with the same binder as the CrOOH/C briquettes) in the same C:Cr molar ratio are also placed in a molybdenum crucible or tray. These samples are then placed in a vacuum furnace and the furnace is sealed. The furnace is evacuated and the temperature gradually raised to a temperature just below that at which chrome oxide begins to react with carbon, about 900° C. The reaction mixtures are held at this temperature to permit off-gassing of the binder and water. The CrOOH/C is dehydrated at this temperature and is converted to an amorphous or microcrystalline $Cr_2O_3/C$. The temperature of the furnace is held at this temperature until it is observed that the total pressure in the furnace begins to fall and re-stabilize. At this point, the temperature in the furnace is raised to 1350° C. (reaction is observed at 1000° to 1450° C. but the preferred temperature range is between 1100° to 1400° C.). At this temperature, $Cr_2O_3$ and C react to produce chrome metal. The pressure in the vacuum furnace rises as the CO reaction product is generated. In order to assure proper reaction, the pressure in the furnace must not be allowed to rise to a point where the reverse reaction is favored. After 5 minutes at this temperature, the power to the furnace is shut down and the furnace is allowed to cool to ambient temperature. Similar runs are conducted with reaction times of 10, 30, 60, 120, and 240 minutes. The test samples are analyzed for chrome, carbon, and oxygen content. Results show that the reaction rate associated with the CrOOH/C material is much faster than that of the physically blended $Cr_2O_3$ and carbon mixtures. Similar testing at lower reaction temperatures shows that the reaction rates of the CrOOH/C particles is sufficiently fast to allow the reaction temperature to be significantly lowered. A comparison of the products obtained from the loose samples indicates that the solid/solid contact provided by the compressive force used in the briquetting operation is not needed to obtain good conversion of the CrOOH/C to chrome metal but is needed with the physically blended $Cr_2O_3$ and C mixture. The reaction rate for the CrOOH/C material is fast enough to permit the continuous reaction of the material to chrome metal in a tubular reactor or in a semi-continuous vacuum furnace. The presence of the excess carbon in the CrOOH/C material makes it particularly suited to radiant or inductive heating.

We claim:

1. A method of making composite particles which comprise hydrous trivalent chromium oxide having the empirical formula $CrO_2H$ and a pulverulent carbonaceous substrate comprising (A) forming a composition which comprises
      (1) an aqueous solution of water-soluble hexavalent chromium compound; and (2) reducing agent in an amount sufficient to reduce said hexavalent chromium compound to said hydrous trivalent chromium oxide and to reduce said hydrous trivalent chromium compound to metallic chromium, said reducing agent comprising water-insoluble pulverulent carbonaceous substrate in an amount in excess of the amount required to reduce said hexavalent chromium compound to said hydrous trivalent chromium oxide, whereby at least some of said carbonaceous substrate remains after said hexavalent chromium compound has been reduced to said hydrous trivalent chromium oxide; and (B) heating said composition under pressure to a temperature of at least about 100° C., which temperature is sufficient to reduce said hexavalent chromium compound to said hydrous trivalent chromium oxide, whereby said hydrous trivalent chromium oxide precipitates onto said pulverulent carbonaceous substrate forming said particles.

2. A method according to claim 1 wherein said hexavalent chromium compound is selected from the group consisting of alkali metal chromates, alkali metal dichromates, chromic acid, and mixture thereof.

3. A method according to claim 2 wherein said hexavalent chromium compound is selected from the group consisting of sodium chromate, sodium dichromate, chromic acid, and mixtures thereof.

4. A method according to claim 3 wherein said hexavalent chromium compound is sodium chromate.

5. A method according to claim 3 wherein said hexavalent chromium compound is sodium dichromate.

6. A method according to claim 3 wherein said hexavalent chromium compound is chromic acid.

7. A method according to claim 1 wherein said carbonaceous substrate is selected from the group consisting of graphite, carbon black, petroleum coke, and mixtures thereof.

8. A method according to claim 1 wherein said particles have a particle size of about 5 to about 20 microns.

9. A method according to claim 1 wherein the concentration of said hexavalent chromium compound is about 10 to about 85% by weight, based on total solution weight.

10. A method according to claim 1 wherein about 3 moles of said carbonaceous substrate, based on carbon content, are present in said particles for every 2 moles of chromium present in said hexavalent chromium compound.

11. A method according to claim 1 wherein said reducing agent consists essentially of said carbonaceous substrates.

12. A method according to claim 11 wherein approximately 4.5 moles of said carbonaceous substrate, based on carbon content, are present in said composition for every 2 moles of chromium present in said hexavalent chromium compound.

13. A method according to claim 1 wherein said composition includes an optional reducing agent which reduces said hexavalent chromium compound to said hydrous trivalent chromium oxide at a lower temperature than does said carbonaceous substrate.

14. A method according to claim 13 wherein said optional reducing agent is selected from the group consisting of carbon monoxide, hydrogen, methane, ethane, propane, sugar, corn syrup, ethanol, and mixtures thereof.

15. A method according to claim 14 wherein said optional reducing agent is carbon monoxide.

16. A method according to claim 1 wherein said hydrous trivalent chromium oxide is CrOOH.

17. A method according to claim 1 wherein said composition is heated at a temperature of about 200° to about 300° C.

18. A method according to claim 17 wherein said heating is for about 5 to about 30 minutes and said pressure is the equilibrium pressure at said temperature.

19. A method according to claim 1 including the additional last steps of filtering and washing said particles.

20. A method according to claim 19 including the additional last step of heating said particles in a vacuum at about 1100° to about 1400° C. to produce metallic chromium.

21. A method according to claim 19 including the additional last step of heating said particles to a temperature of about 300° to about 500° C. to convert said hydrous trivalent chromium oxide to chromic oxide.

22. A method according to claim 21 including the additional last step of heating said particles in a vacuum at about 1100° to about 1400° C. to produce metallic chromium.

23. A method of making composite particles which comprise hydrous trivalent chromium oxide having the empirical formula $CrO_2H$ and a pulverulent carbonaceous substrate comprising (1) forming a slurry which comprises
  (a) an aqueous solution of about 10 to about 85 wt %, based on solution weight, of a water-soluble hexavalent chromium compound selected from the group consisting of sodium, chromate, sodium dichromate, chromic acid, and mixtures thereof; and
  (b) water-insoluble pulverulent carbonaceous substrate in an amount approximately equal to the amount required to reduce said hexavalent chromium compound to said hydrous trivalent chromium oxide, and to reduce said hydrous trivalent chromium oxide to metallic chromium; and (2) heating said slurry under pressure at about 200° to about 300° C. to cause said carbonaceous substrate to reduce said hexavalent chromium compound to said hydrous trivalent chromium oxide, whereby said hydrous trivalent chromium oxide precipitates onto said pulverulent carbonaceous substrate forming said particles.

24. Composite particles comprising hydrous trivalent chromium oxide and a carbonaceous substrate, made by (A) forming a composition which comprises
  (1) an aqueous solution of water-soluble hexavalent chromium compound; and
  (2) reducing agent in an amount sufficient to reduce said hexavalent chromium compound to said hydrous trivalent chromium oxide and to reduce said hydrous trivalent chromium compound to metallic chromium, said reducing agent comprising water-insoluble pulverulent carbonaceous substrate in an amount in excess of the amount required to reduce said hexavalent chromium compound to said hydrous trivalent chromium oxide, whereby at least some of said carbonaceous substrate remains after said hexavalent chromium compound has been reduced to said hydrous trivalent chromium oxide; and (B) heating said composition under pressure to a temperature of at least about 100° C., which temperature is sufficient to reduce said hexavalent chromium compound to said hydrous trivalent chromium oxide, whereby said hydrous trivalent chromium oxide precipitates onto said carbonaceous substrate forming said particles.

25. A method of making metallic chromium comprising heating particles according to claim 24 in a vacuum at a temperature of about 1100° to about 1400° C.

26. A method of making metallic chromium comprising (A) forming a composition which comprises
  (1) an aqueous solution of water-soluble hexavalent chromium compound; and
  (2) a reducing agent in an amount sufficient to reduce said hexavalent chromium compound to said hydrous trivalent chromium oxide and to reduce said hydrous trivalent chromium compound to metallic chromium, said reducing agent comprising water-insoluble pulverulent carbonaceous substrate in an amount in excess of the amount required to reduce said hexavalent chromium compound to said hydrous trivalent chromium oxide, whereby at least some of said carbonaceous substrate remains after said hexavalent chromium compound has been reduced to said hydrous trivalent chromium oxide;

(B) heating said composition under pressure to a temperature of at least about 100° C., which temperature is sufficient to reduce said hexavalent chromium compound to said hydrous trivalent chromium oxide, whereby particles are formed that comprise hydrous trivalent chromium oxide having the empirical formula $CrO_2H$ intimately associated with said carbonaceous substrate;

(C) filtering, washing, and drying said particles; and (D) heating said particles in a vacuum at about 1100° to about 1400° C. to reduce said hydrous trivalent chromium oxide to metallic chromium.

27. A method according to claim 26 wherein said hexavalent chromium compound contains less than 0.25% by weight sulfate, said reducing agent contains less than 0.01% by weight sulfur, and said metallic chromium contains less than 0.007% by weight sulfur.

28. A method according to claim 26 wherein step (D) is performed without an intermediate grinding or briquetting step.

29. A method according to claim 26 wherein said particles are heated as a powder, and are not mixed with a binder and briquetted.

30. A method according to claim 1 wherein said hexavalent chromium compound is selected from the group consisting of sodium chromate, sodium dichromate, and mixtures thereof, and the concentration of said hexavalent chromium compound is less than 10%.

31. A method according to claim 1 wherein said carbonaceous substrate has a particle size of less than 200 mesh.

32. A method according to claim 1 wherein said composition includes a desulfurizing agent.

* * * * *